US007942180B2

(12) United States Patent
Aengenvoort et al.

(10) Patent No.: US 7,942,180 B2
(45) Date of Patent: May 17, 2011

(54) APPARATUS FOR APPLYING GLUE TO FIBERS FOR MAKING FIBERBOARD

(75) Inventors: Dieter Aengenvoort, Weeze (DE); Michael Schöler, Rheurdt (DE); Klaus Schürmann, Jüchen (DE); Lothar Sebastian, Duisburg (DE)

(73) Assignee: Siempelkamp Maschinen-und Anlagenbaw GmbH & Co. KG, Krefeld (DE)

( * ) Notice: Subject to any disclaimer, the term of this patent is extended or adjusted under 35 U.S.C. 154(b) by 138 days.

(21) Appl. No.: 12/447,285

(22) PCT Filed: Oct. 27, 2007

(86) PCT No.: PCT/EP2007/009339

§ 371 (c)(1), (2), (4) Date: Apr. 27, 2009

(87) PCT Pub. No.: WO2008/071260

PCT Pub. Date: Jun. 19, 2008

(65) Prior Publication Data

US 2010/0065218 A1 Mar. 18, 2010

(30) Foreign Application Priority Data

Dec. 13, 2006 (DE) ........................ 10 2006 058 625

(51) Int. Cl.
*B32B 41/00* (2006.01)

(52) U.S. Cl. ........................................ 156/378; 156/578

(58) Field of Classification Search .................. 156/378, 156/578, 62.2, 62.4; 264/109, 116
See application file for complete search history.

(56) References Cited

U.S. PATENT DOCUMENTS 4,670,302 A 6/1987 Oldemeyer et al. ........... 427/212

FOREIGN PATENT DOCUMENTS

| | | |
|---|---|---|
| CA | 2094940 | 10/1994 |
| DE | 1653223 | 9/1970 |
| DE | 10247412 | 4/2004 |
| DE | 10247414 A1 * | 4/2004 |
| WO | WO-02062544 | 8/2002 |
| WO | WO-2004035278 | 4/2004 |
| WO | WO-2004052603 | 6/2004 |
| WO | WO-2005065905 | 7/2005 |

OTHER PUBLICATIONS

Translation of DE 102 47 414 A1. Published Apr. 2004. First Named Inventor—Clasen, Heinz.*

* cited by examiner

*Primary Examiner* — George R Koch, III
(74) *Attorney, Agent, or Firm* — Andrew Wilford

(57) ABSTRACT

The invention relates to an installation for applying glue to fibers for the production of fiberboard, especially MDF board or similar wood material board. Said installation comprises a fiber feed unit having at least one fiber feed conduit which opens into a fiber exit tube via e.g. an arched fiber deflection element and receives the air that is used to transport the fibers, a chute which is located downstream of the fiber exit tube, a glue application device which is located between the fiber exit tube and the chute and which has spray nozzles for spraying the fibers that emerge from the fiber exit tube and enter the chute with drops of glue, and a collection device, located downstream of the chute and having a transport device for collecting and optionally carrying off the fibers and a suction device for suctioning air from the chute through the transport belt. The installation is characterized in that the spray nozzles or at least some of the spray nozzles can be transferred from a standby position to a working position and vice versa for applying glue to the fibers.

13 Claims, 5 Drawing Sheets

APPARATUS FOR APPLYING GLUE TO FIBERS FOR MAKING FIBERBOARD

CROSS REFERENCE TO RELATED APPLICATIONS

This application is the US national phase of PCT application PCT/EP2007/009339, filed 27 Oct. 2007, published 19 Jun. 2008 as WO2008/071260, and claiming the priority of German patent application 102006058625.5 itself filed 13 Dec. 2006, whose entire disclosures are herewith incorporated by reference.

FIELD OF THE INVENTION

The invention relates to an apparatus for applying glue fibers for making fiberboard, in particular, MDF board or similar wood-containing board.

BACKGROUND OF THE INVENTION

Such an apparatus typically has a fiber supply with at least one fiber-supply conduit to which air is fed to transport the fibers, the conduit being connected, e.g. through a curved fiber diversion conduit to a fiber-discharge conduit, a chute downstream of the fiber-discharge conduit, a glue applicator between the fiber-discharge conduit and the chute and having spray nozzles for coating fibers emerging from the fiber-discharge conduit and entering the chute with glue droplets, and a collection device with a conveyor downstream of the chute for catching and optionally removing the fibers, and a suction device for drawing air from the chute through the conveyor belt. The conveyor is preferably designed as an air-permeable conveyor belt, e.g. a screen belt, wherein the suction device is below the conveyor belt. Furthermore, an air-jacket forming device with one or more air-jacket lines to generate an air-jacket stream surrounding the fiber flow in the chute is preferably provided below the glue applicator, and thus in the upper region of the chute. Both the transport air and the jacket air are aspirated through the air-permeable conveyor belt by means of the suction device. What is thus effected is that the fibers are fed pneumatically, the fibers entering the region of the glue applicator from the fiber-discharge conduit that is typically vertical. That is where the spray nozzles are used to apply glue droplets to the fibers. The fibers then drop through the chute onto the conveyor belt that is below the chute. The glue-coated fibers come to rest on this conveyor belt.

Any unused glue falling within the chute passes onto the fibers on the conveyor belt, thereby ensuring complete utilization of the glue and reliably preventing contamination of the apparatus by unused glue. MDF board refers to medium density fiberboard.

Apparatuses for applying glue to fibers for the fabrication of fiberboard of the type described in the introduction have been disclosed, for example, in DE 102 47 412, [WO 2004/035279], DE 102 47 413 [WO 2004/035278], DE 102 47 414 [WO 2004/052603], and DE 10 2004 001 527 [WO 2005/065905]. In the known apparatuses, the spray nozzles are on at least one nozzle ring surrounding the fiber stream emerging from the fiber-discharge conduit, or they form a nozzle ring surrounding the fiber stream. The adjustment angle of the spray nozzles relative to the fiber stream and/or the distance of the spray nozzles from the fiber stream is adjustable. In addition, the spray nozzles can be made changeable in their position, e.g. in a movable fashion on the nozzle ring. The known apparatus thus allows for adjustment of the spray nozzle position to meet requirements. The known measures have proven to be successful in principle, however, they are capable of being further developed.

OBJECT OF THE INVENTION

The basic object of the invention is to create an apparatus of the type described above with which glue can be applied to fibers for the fabrication of fiberboard, in particular, MDF board, in a more efficient and economical manner. In particular, the objects are to prevent contamination of the apparatus and to ensure problem-free operation.

SUMMARY OF THE INVENTION

In order to solve this problem, the invention teaches an approach whereby the spray nozzles, or at least some of the spray nozzles, in a generic device for applying glue to fibers for the fabrication of fiberboard of the type described above can move from a standby position to a working position and vice versa.

To this end, the spray nozzles (or some of the spray nozzles) are preferably attached to pivotal levers, and are able to be pivoted by these pivotal levers from the standby position into the working position, as well as from the working position into the standby position.

The invention is based on the insight that a problem-free application of glue is ensured, and most importantly contamination and breakdowns of the apparatus can be reliably prevented, if the system ensures that the spray nozzles are not mounted "permanently" in the glue-application region, but instead the possibility exists of pivoting the spray nozzles into the glue-application region and thus into the working position only as required. Within the scope of the invention it is therefore possible to position the spray nozzles normally in the standby position as the starting position, then to pivot them into the working position only when fibers are actually emerging from the fiber-discharge conduit and thus must have glue applied to them. In terms of there being any design-based danger that glue would escape from the nozzles outside the period of the glue-application operation, for example as residual drips, the invention ensures that these unwanted glue droplets do not pass into the glue-application region, and, in particular, do not pass into the chute or onto the downstream conveyor belt, but instead can be collected outside the actual glue-application region. In addition, the putting the spray nozzles in a standby position ensures that simple and efficient maintenance or repair of the nozzles is possible since these can be easily retracted from the working region, and are thus accessible for maintenance and repair work. The invention proposes in this connection that each spray nozzle be pivotal in or pivotal out either individually, or jointly, in other words in groups. This approach thus provides the capability of pivoting the majority of the spray nozzles on their pivotal levers into the working position to effect operation, while only individual spray nozzles along with their pivotal levers remain in the standby position, thereby enabling maintenance or repair to be performed even during operation of the apparatus. This is because within the scope of the invention a plurality of spray nozzles is preferably mounted on the nozzle ring, e.g. 10 to 20 spray nozzles. The arrangement is preferably selected here so as to effect a complete spraying over the entire coverage extent while taking into account the spray characteristics of the spray nozzles so that excessive overlapping of the individual spray nozzles is prevented.

In an advantageous development of the invention, it is proposed that the pivotal lever be pivotal in or pivotal out by means of drives, a separate drive is preferably associated with each individual pivotal lever, it then being advantageous for each individual drive to be separately controllable. These drives can be in the form of pneumatic or hydraulic drives, e.g. linear actuators that are attached to the rotatably mounted pivotal levers. To this end, it is useful if the pivotal levers each have at least one swivel arm and at least one link arm. The spray nozzles can be connected for example to the end of the respective swivel arm, while a corresponding drive is connected to the link arm. The pivotal levers here can thus be essentially L-shaped. The drives, e.g. the pneumatic linear actuators or pneumatic cylinder-piston arrangements, can themselves be mounted pivotally or movably on a corresponding frame.

As was already explained, it is of particular importance in the event of any residual droplets escaping from the glue nozzles that this glue can be reliably prevented from passing into the chute. It is advantageous in this connection to have one or more drip pans associated with the spray nozzles, these pans being below each spray nozzle in the standby position. It can be advantageous in this regard to have a separate drip pan associated with each individual spray nozzle; however, it is also possible to provide drip pans for multiple spray nozzles. In any case, the possibility exists whereby the glue emerging from the spray nozzles is collected, removed, and optionally reused. This approach enables contamination of the apparatus to be prevented in an especially reliable manner. In addition, it can result in an especially high utilization of the glue.

In a preferred embodiment, the invention proposes that the spray nozzles be connected to a controller that pivots the spray nozzles from the standby position into the working position during the glue-application operation, and (automatically) pivots these nozzles from the working position into the standby position when the glue-application operation is interrupted. To achieve this, at least one fiber sensor for detecting the glue-application operation can be connected to the controller, the sensor being in the region of the fibers emerging from the fiber-discharge conduit and entering the chute. This fiber sensor can be an optical sensor. The invention is based here on the insight that it is advantageous to initially hold the spray nozzles in the standby position and to allow them to pivot into the working position only when fibers are actually emerging from the fiber-discharge conduit and moving through the glue-application region into the chute. A corresponding signal for the controller that indicates the glue-application operation can in principle be captured from any region of the apparatus, the only requirement being that this signal contain the information that fibers are moving through. It is especially advantageous, however, to utilize the sensor as described.

Using the known approach, the spray nozzles are two-component nozzles, and are thus connected to a glue-delivery line and a first pressurized-air line for the atomizing air. In another proposal of the invention, provision is made whereby the spray nozzles have at least one movably guided cleaning pin that preferably can fit into the orifice outlet of the respective nozzle such that any clogging of the nozzle orifice can be prevented by actuating this pin, or such clogging can be broken up. To accomplish this, a second pressurized-air line is provided for the nozzle, this line supplying control air for this cleaning pin.

BRIEF DESCRIPTION OF THE DRAWING

In the following, the invention is described in more detail with reference to a drawing that illustrates only one embodiment. In the drawing.

SPECIFIC DESCRIPTION

Figure 1:
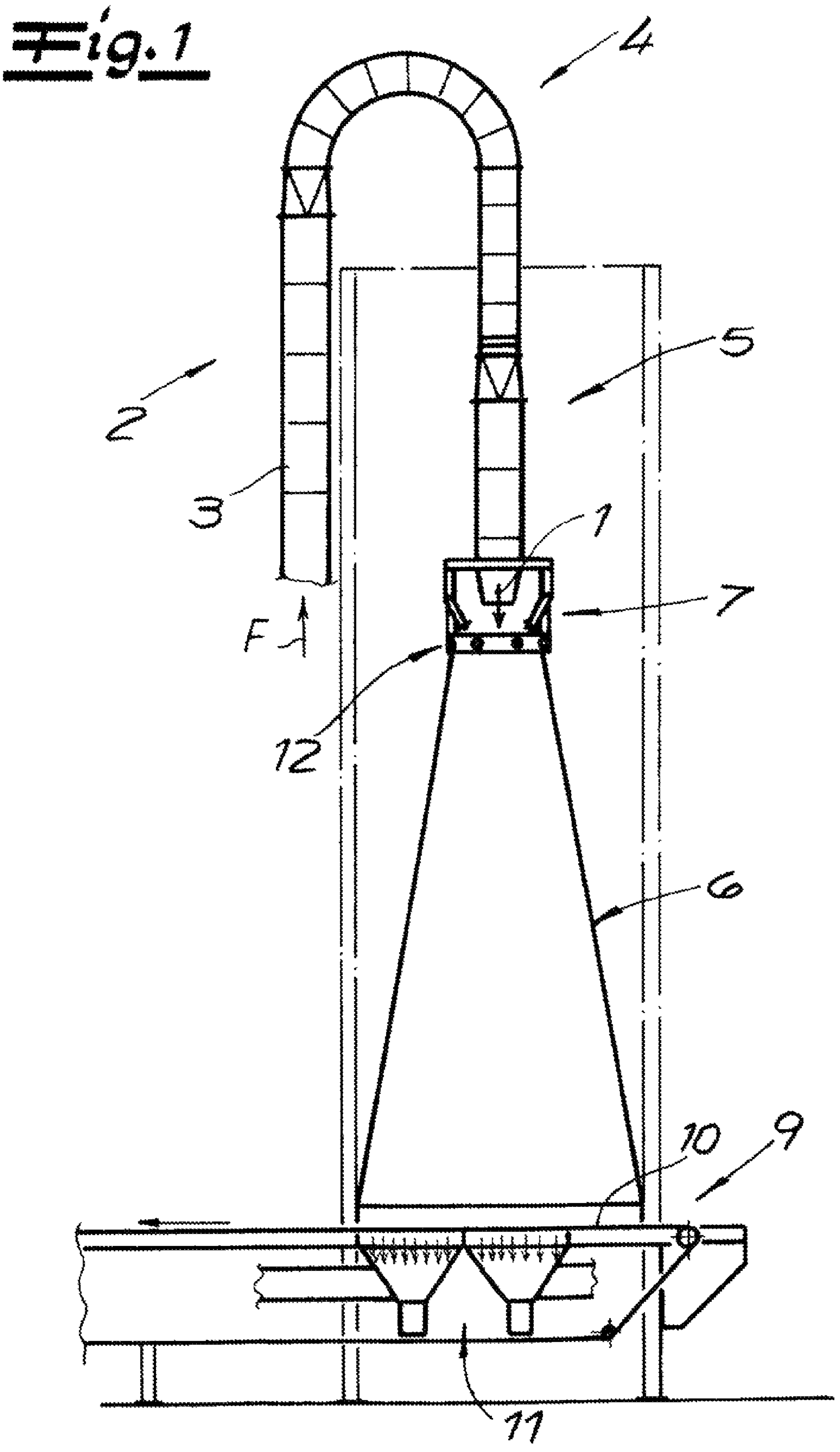
FIG. 1 is a simplified schematic view illustrating an apparatus according to the invention for applying glue to fibers.

The figures illustrate an apparatus for applying glue to fibers 1 for making fiberboard, in particular, MDF board. The apparatus is set up for continuous operation and has a fiber supply 2 having a fiber-supply conduit 3 to which is fed transport air F to convey the fibers, the fiber-supply conduit opening through a curved fiber diversion conduit 4 into a fiber-discharge conduit 5. In addition, a chute 6 is provided downstream of the fiber-discharge conduit 5. A glue applicator 7 having a plurality of spray nozzles 8 (FIG. 2) is provided between the fiber-discharge conduit 5 and the chute 6, the nozzles 8 being used to spray the fibers 1 emerging from the fiber-discharge conduit 5 and entering the chute 6 with glue droplets. In the illustrated embodiment, sixteen spray nozzles 8 are provided on a nozzle ring surrounding the fiber stream. A collection device 9 is provided downstream of the chute 6, the device having a conveyor 10 for catching and optionally removing fibers 1, and a suction device 11 for drawing air from the chute 6. The conveyor 10 is an air-permeable conveyor belt, e.g. a screen belt 10. The suction device 11 is below the conveyor belt 10 to draw air from the chute 6 down through the conveyor belt 10.

The fibers to which glue is to be applied are conveyed by the transport air F through the essentially vertical straight fiber supply conduit 3, then through the connecting curved fiber diversion conduit 4, and finally down through fiber-discharge conduit 5, which is also designed so as to be essentially vertical and straight, into the glue-application region between the fiber-discharge conduit 5 and the chute 6. The fibers to which glue has been applied by the glue applicator 7 then fall through the chute 6 onto the conveyor belt 10 and are removed by this belt.

The chute 6 has a downwardly flaring cross-section. Also shown in the figures is an air-jacket forming device 12 below the glue applicator 7, this air-jacket forming device 12 having multiple air-jacket lines 13 to generate an air-jacket M surrounding the fiber stream in the chute. As a result, both the transport air F and the jacket air M, as well as any ambient air U entering the chute 6 or supplied to the chute 6 are aspirated by the suction device 11.

Figure 2:
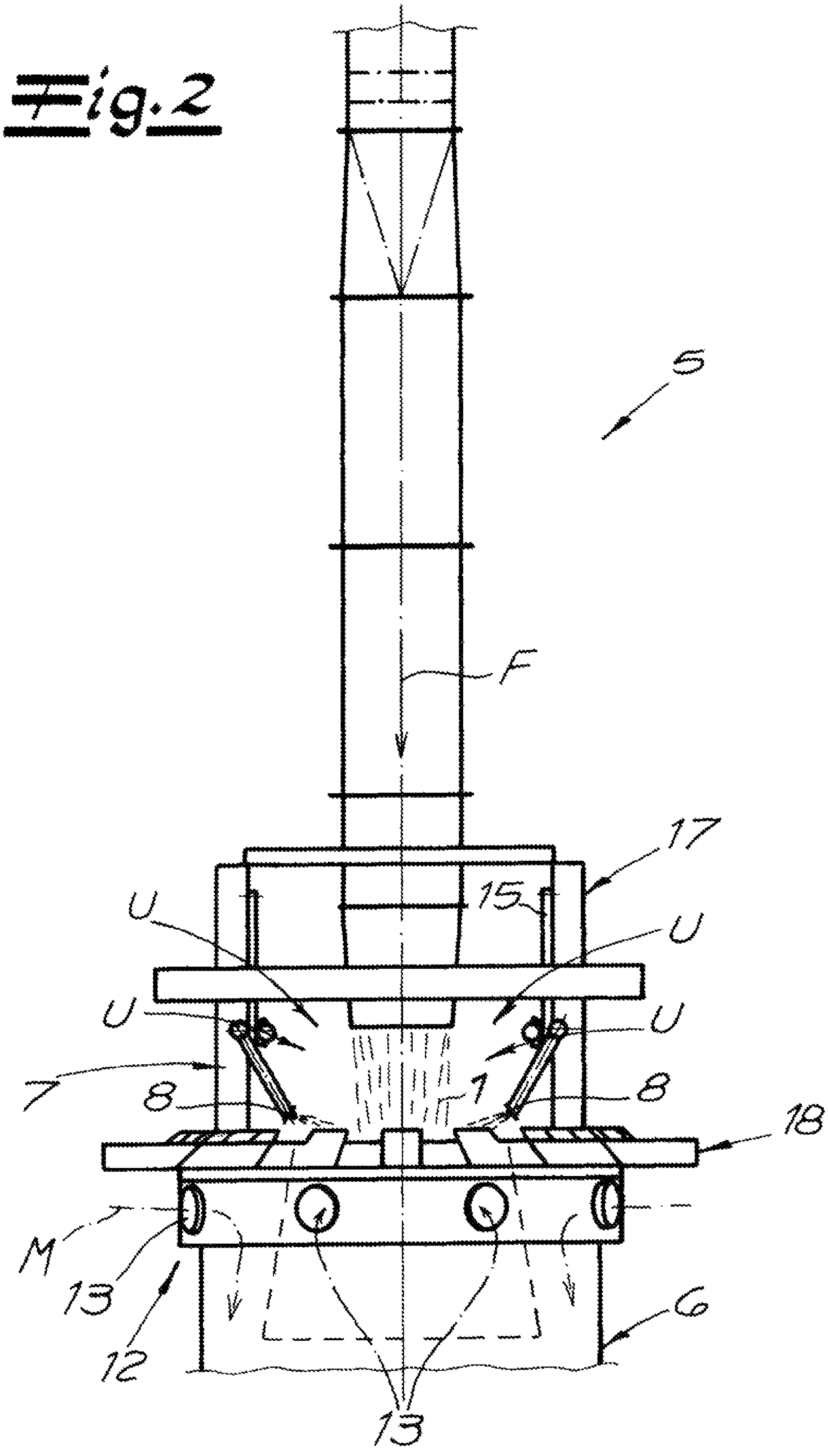
FIG. 2 shows an enlarged section of the structure of FIG. 1.
Figure 3:
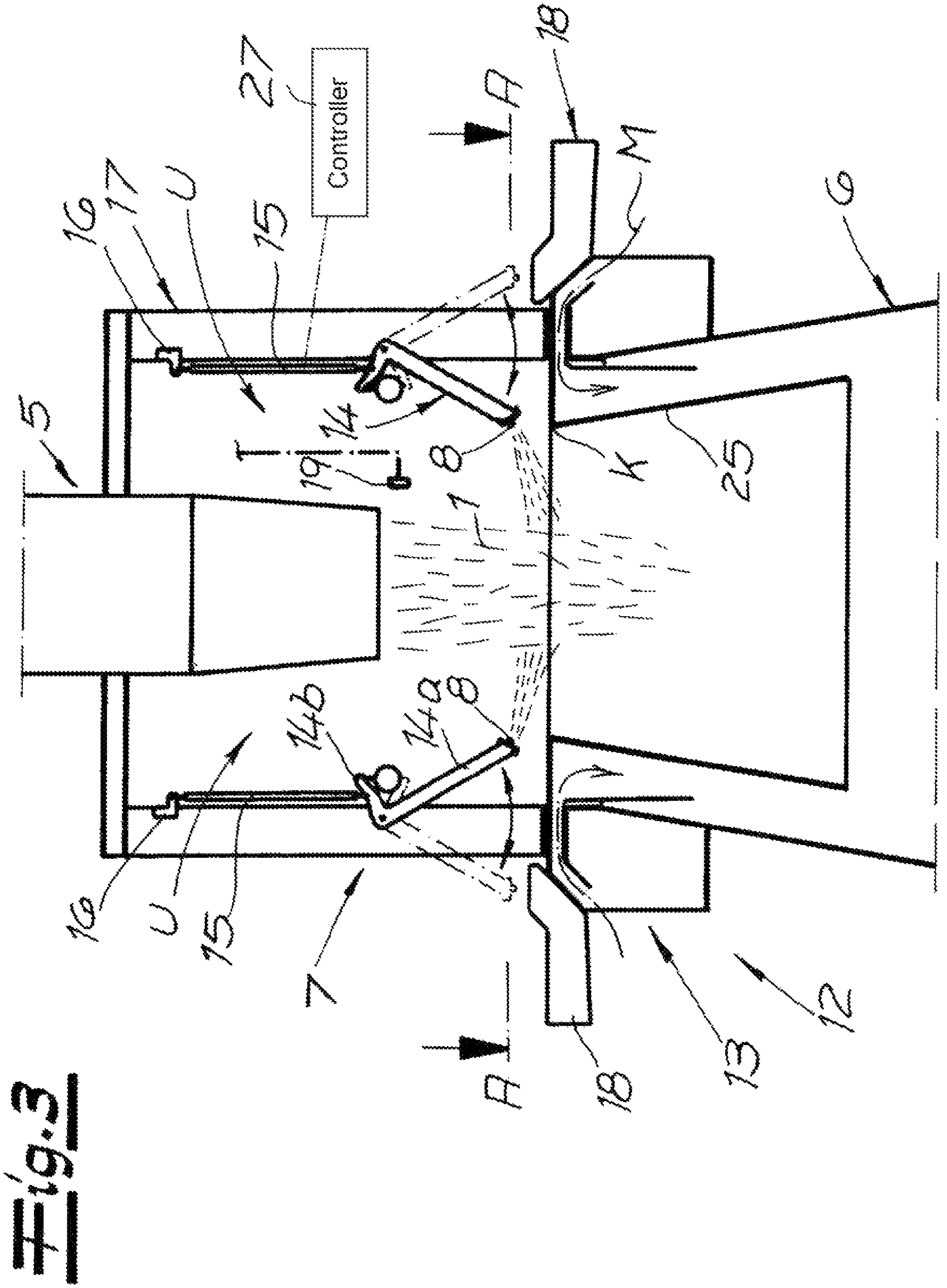
FIG. 3 is an enlarged view illustrating a longitudinal section through the structure of FIG. 1.
Figure 4:
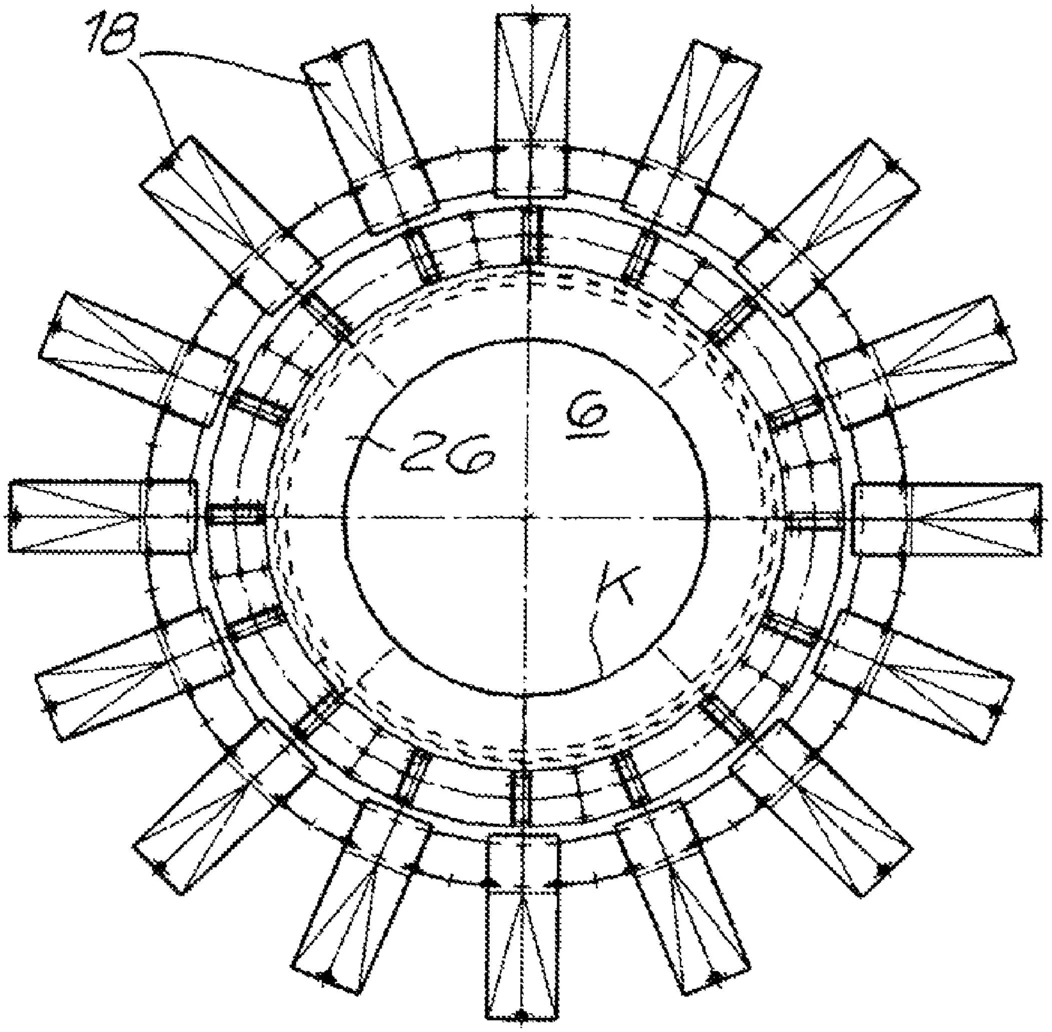
FIG. 4 shows a section the structure taken along line A-A of FIG. 3.

FIGS. 2 and 3 show that the spray nozzles 8 can be shifted according to the invention from a standby position to a working position to apply glue to the fibers, and vice versa.

To this end, each spray nozzle 8 is attached to a pivotal lever 14. The spray nozzles 8 are pivotal in by these pivotal levers 14 from the standby position into the working position, as well as pivotal out from the working position into the standby position. In FIGS. 2 and 3, the spray nozzles 8 along with their pivotal levers 14 are in the working position. The standby position is indicated only by dot-dashed lines. Each spray nozzle 8 is attached to a respective individual pivotal lever 14, the pivotal levers 14 being able to pivot in or out either individually or also jointly.

FIG. 3 furthermore shows that the pivotal levers 14 are pivotal in and out by means of respective pivot drives 15. These drives 15 are pneumatic linear actuators, specifically, pneumatic cylinder-piston arrangements that are connected to the pivotally mounted levers 14. In principle, rotary drives can also be connected to the pivotal levers 14. A spindle drive or the like can also be used as the linear actuator. These embodiments are not shown in the figures.

Each pivotal lever 14 has an arm 14*a* at one end and a link arm 14*b* at the other end. The spray nozzles 8 are mounted at the end of the arm 14*a*. The cylinder-piston arrangements are connected as drives 15 to the link arms 14*b*, the pivotal levers 14 consequently being essentially L-shaped. The pneumatic linear actuators 15 are each connected at one end to the respective pivotal lever 14, specifically to the respective link arm 14*b*, and at the other end are pivotally linked to a respective mounting bracket 15 on a frame 16 carried on a housing 17. In addition, a drip pan 18 is associated with each spray nozzle 8, the pan 18 being below the spray nozzles 8 in the standby position.

According to the invention, a control means or controller 27 is provided that is connected to the spray nozzles or the drives 15, this controller 27 pivoting the spray nozzles 8 out from the standby position to the working position during the glue-application operation, and automatically pivoting them from the working position into the standby position when the glue-application operation is interrupted. In addition, this controller 27 can itself control the spray nozzles 8 and thus the discharge of glue. In this regard, provision is made whereby the controller 27 pivots the spray nozzles 8 into the working position only during the glue-application operation. This approach, in particular, enables contamination of the apparatus to be prevented, since any residually escaping droplets of glue cannot penetrate into the chute 6 during nonoperating periods but in the standby position are instead collected by drip pans 18. To this end, it is advantageous if a fiber sensor 19 is provided in the region of the fiber outlet, e.g. between fiber-discharge conduit 5 and chute 6, which sensor 19 can for example be an optical sensor and generate a signal that depends on whether or not fibers 1 are emerging from the fiber-discharge conduit 5. This fiber sensor 19 is also connected to the controller 27.

Figure 5:
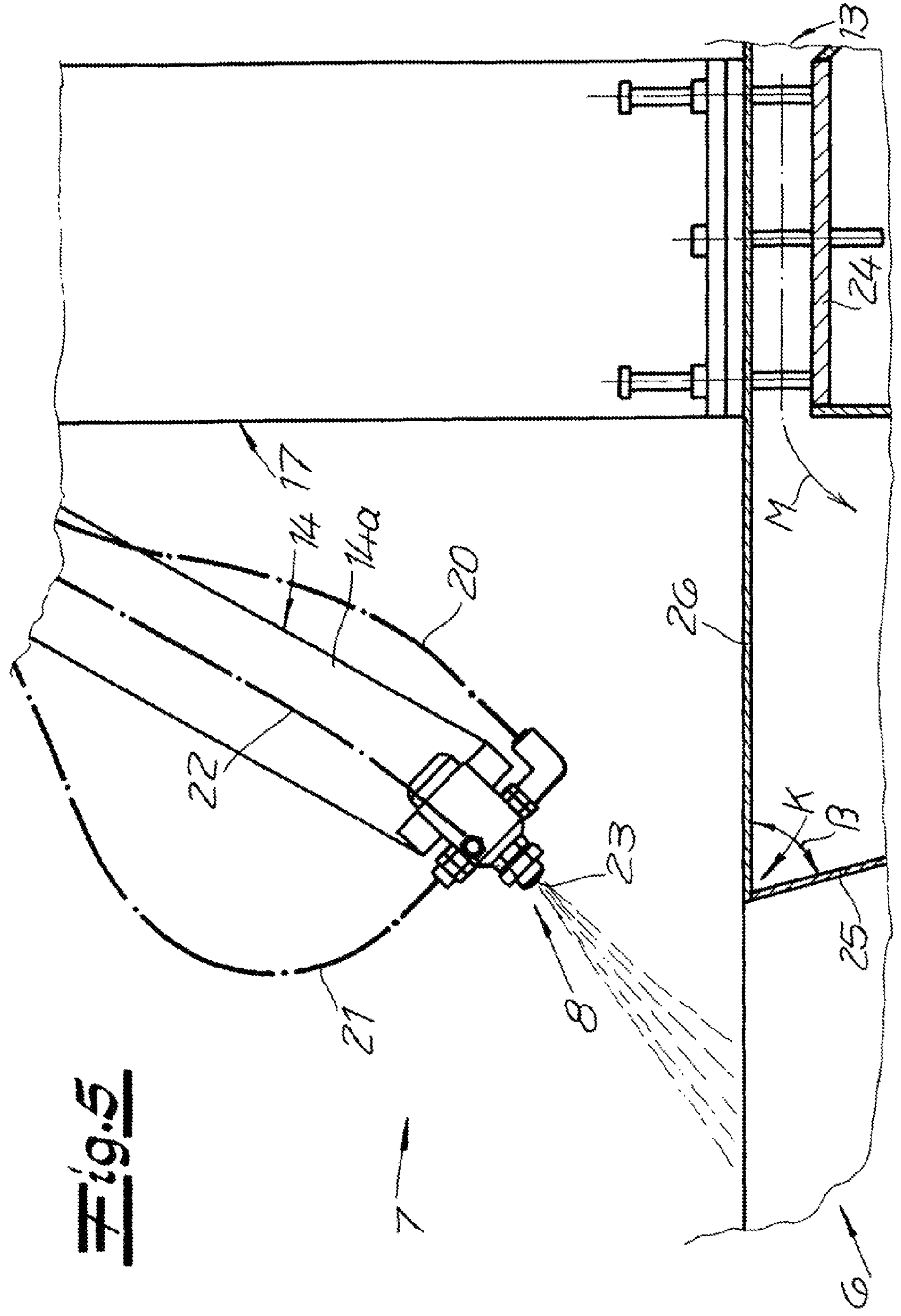
FIG. 5 shows a section through the structure of FIG. 3 in the region of a spray nozzle.

As indicated in FIG. 5, the spray nozzles 8 are two-component mixing nozzles and for thus purpose a glue supply line 20 and a first pressurized-air delivery line 21 are connected that deliver atomizing air. According to the invention, the spray nozzles 8 furthermore have a movable cleaning pin, not shown that can clear the nozzle orifice 23 of the spray nozzle and prevent its contamination. A second pressurized-air line 22 is provided to control this cleaning pin, this line delivering control air for the cleaning pin.

Finally, the figures show that jacket air M is introduced through a throttle-ring assembly having an adjustable annular throttle opening 24 and an air-jacket deflector. To this end, an inner air-jacket ring 25 is provided inside the chute 6, the ring being connected to a base plate or a base ring 26 of the glue-application area and forming a sharp edge K. In this way, a strong swirling of jacket air M is generated. Surprisingly, this results in especially stable flow conditions in the chute 6, and contamination of the walls of the chute is reliably prevented. Within the scope of the invention, the sharp edge, in particular, has a non-rounded edge with an edge angle β between the air-jacket ring 25 and the base ring 26, where $\beta \leqq 120°$, preferably, $\beta \leqq 90°$.

The invention claimed is:

1. An apparatus for applying glue to fibers for making wood-containing fiberboard, the apparatus comprising a fiber supply having at least one fiber-supply conduit to which air is fed to transport the fibers, the conduit being connected to a fiber-discharge conduit, a chute downstream of the fiber-discharge conduit, a glue applicator between the fiber-discharge conduit and the chute and having a plurality of pivotal levers each carrying a respective spray nozzle for coating fibers emerging from the fiber-discharge conduit and entering the chute with glue droplets, a collection device with a conveyor downstream of the chute for catching and optionally removing the fibers, a suction device for drawing air from the chute through the conveyor, means for pivoting the levers and thereby moving at least some of the spray nozzles between a standby position and a working position to apply glue to the fibers.

2. The apparatus according to claim 1 wherein the pivotal levers are able to be pivoted in or out either singly or jointly.

3. The apparatus according to claim 1, further comprising respective drives for pivoting the pivotal levers in or out.

4. The apparatus according to claim 3 wherein the drives are pneumatic or hydraulic actuators that are connected to the pivotal levers.

5. The apparatus according to claim 4 wherein the pivotal levers each have at least one arm on which the respective spray nozzle is mounted and at least one link arm to which the respective drive is connected.

6. The apparatus according to claim 1, further comprising one or more drip pans associated with the spray nozzles and below the spray nozzles.

7. The apparatus according to claim 1, further comprising control means connected to the levers nozzles for pivoting the spray nozzles out from the standby position into the working position during a glue-application operation and for pivoting the nozzles out from the working position into the standby position when the glue-application operation is interrupted.

8. The apparatus according to claim 7, further comprising at least one fiber sensor for detecting the glue-application operation and connected to the control means, the sensor being in the region of the fibers emerging from the fiber-discharge conduit and entering the chute.

9. The apparatus according to claim 8 wherein the fiber sensor is an optical sensor.

10. The apparatus according to claim 1 wherein the spray nozzles are two-component nozzles, the apparatus further comprising a glue supply line and a first pressurized-air line for respectively supplying glue and atomizing air to the spray nozzles, the spray nozzles each having at least one movably guided cleaning pin, the apparatus further comprising means for supplying control air through a second pressurized-air line to the movably guided cleaning pin.

11. An apparatus for applying glue to fibers for making fiberboard, the apparatus comprising:

a conduit assembly including a vertical intake conduit, an adjacent vertical discharge conduit, and an arcuate diverting conduit connected between upper ends of the intake and discharge conduits;

means for blowing fibers into a lower end of the intake conduit, whereby the fibers exit from a lower end of the discharge conduit;

a downwardly open chute below the lower end of the discharge conduit;

a collection device including a horizontally moving conveyor below the chute, whereby fibers dropping in the chute form a mat atop the conveyor;

an annular array of levers surrounding the lower end of the discharge conduit and each having an outer end carrying a nozzle and shiftable between a working position with the respective nozzle engaged between the lower end of the discharge conduit and an upper end of the chute and a standby position out from between the discharge conduit and the chute;

means for supplying glue to the nozzles for spraying the glue on the fibers descending from the discharge conduit into the chute; and actuator means for pivoting the levers between the standby positions and the working positions.

12. The apparatus defined in claim 11 wherein the actuators are fluid-powered cylinders.

13. The apparatus defined in claim 11, further comprising means for sensing when fibers are coming downward out of the lower end of the discharge conduit; and control means connected to the sensing means for automatically pivoting the levers and their nozzles into the standby position when no fibers are coming downward out of the lower end of the discharge conduit.

* * * * *

UNITED STATES PATENT AND TRADEMARK OFFICE

CERTIFICATE OF CORRECTION

PATENT NO. : 7,942,180 B2
APPLICATION NO. : 12/447285
DATED : May 17, 2011
INVENTOR(S) : Dieter Aengenvoort et al.

It is certified that error appears in the above-identified patent and that said Letters Patent is hereby corrected as shown below:

On the title page, item [73]

The spelling of the Assignee name should be changed from "Siempelkamp Maschinen-und Anlagenba*w* GmbH & Co. KG"

To -- Siempelkamp Maschinen-und Anlagenbau GmbH & Co. KG --

Signed and Sealed this
Fourteenth Day of February, 2012

David J. Kappos
*Director of the United States Patent and Trademark Office*